United States Patent
Bohlman (10) Patent No.: US 10,858,029 B2
(45) Date of Patent: Dec. 8, 2020

(54) DETACHABLE WHEEL ASSEMBLY FOR WHEELED CASES

(71) Applicant: Rick D. Bohlman, San Diego, CA (US)

(72) Inventor: Rick D. Bohlman, San Diego, CA (US)

( * ) Notice: Subject to any disclaimer, the term of this patent is extended or adjusted under 35 U.S.C. 154(b) by 169 days.

(21) Appl. No.: 16/280,227

(22) Filed: Feb. 20, 2019

(65) Prior Publication Data
US 2019/0263436 A1 Aug. 29, 2019

Related U.S. Application Data

(60) Provisional application No. 62/635,372, filed on Feb. 26, 2018.

(51) Int. Cl.
| | |
|---|---|
| *A45C 11/00* | (2006.01) |
| *B62B 1/10* | (2006.01) |
| *B62B 5/00* | (2006.01) |
| *A45C 13/26* | (2006.01) |
| *A45C 5/14* | (2006.01) |

(52) U.S. Cl.
CPC ............ *B62B 5/0083* (2013.01); *A45C 5/143* (2013.01); *A45C 11/00* (2013.01); *A45C 13/262* (2013.01); *B62B 1/10* (2013.01)

(58) Field of Classification Search
CPC ......... B62B 5/0083; B62B 1/10; A45C 5/143; A45C 11/00; A45C 13/262
See application file for complete search history.

(56) References Cited

U.S. PATENT DOCUMENTS 2,375,338 A * 5/1945 Alexander ............ B62B 5/0083
280/47.131

* cited by examiner

*Primary Examiner* — Bryan A Evans
(74) *Attorney, Agent, or Firm* — Eric Hanscom (57) ABSTRACT

This invention is directed toward a wheel assembly that can easily be attached and detached from a case—specifically in a preferred embodiment an SKB 3i series case—such that the case can be wheeled when needed, but have the wheels removed for storage or transportation in a vehicle or plane. The wheel assembly comes in three parts—an axel, two wheels, and two wheel mounts—so it is simple to assembly, and because it has no moving parts, it is solid and durable.

19 Claims, 11 Drawing Sheets

DETACHABLE WHEEL ASSEMBLY FOR WHEELED CASES

CROSS REFERENCE TO RELATED APPLICATIONS

This application claims priority back to U.S. Provisional No. 62/635,372, filed Feb. 26, 2018, entitled "Detachable wheel assembly for wheeled cases, specifically SKB 3i Series case", the contents of which are incorporate herein by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of detachable wheels that can be temporarily attached to and removed from wheeled cases depending on whether the user wants to wheel them or pack them for transport or storage. The example used in this provisional patent application is the SKB 3i Series of cases, and more specifically, to more specifically to a detachable, large diameter wheel assembly that can be attached and detached from a SKB 3i Series case.

The case being used for illustration here is a standard case for transportation a quadcopter or drone. The case has a hollowed-out base, usually with cushioning foam cut out in the shape of a particular brand and model of drone, and a lid that rotates down on the top of the base through hinges, then locks with a latch. The case has two sets of small wheels at the back bottom of the case which work very well on smooth, flat surfaces, but not so well over the rough terrain a drone pilot often has to traverse to reach a location for his or her flight. The case also has two cavities, called end foot sleeves.

The wheel assembly is basically an axel with a wheel on either send and two "wheel mounts" in between the wheels and the axel. These wheel mounts have a long end, called a "mount tongue", and a hook-shaped end called a "hook". As a general overview of the invention, the mount tongue of the wheel mount at one end slides into the case's wheel end foot sleeve and the hook of the wheel mount snaps around the existing wheel system on the case. The complete assembly is held in place by resistance created by the hook wrapping around more than 50% of the SKB stock wheel and at the hook's end being slightly smaller diameter than the wheels of the SKB case. This allows a user to quickly and effectively add wheels to a case, such that when the user wants to wheel the case, he/she can easily attach the wheels, but when the case is going to be stored or shipped, the wheels and axel can be easily removed.

Problem solved by this invention. As the drone industry evolves, drones have been getting larger, more sophisticated, and heavier. Five years ago, the skies were ruled by DJI's Phantom 2 line of drones, which were around a cubic foot in size and weighed around three pounds. Since then, drones have begun carrying better (and heavier) cameras and other payloads such as remote sensors, lidar, and even seed dispersers. The size of batteries and propellers also increased, to the point where many of today's "commercial" drones are two to three times the size of the Phantom line.

And, while five years ago it was fairly easy to put a Phantom in a backpack and haul it around, putting one of today's larger, heavier drones with extra batteries into a backpack is way too large, cumbersome and heavy to safely or comfortably carry on one's back. Thus, wheeled cases made their way into the drone world several years ago. Because these cases were wheeled, a user could more easily transport a drone case from job to job. However, like their counterparts in the suitcase industry, the protruding wheels were a weak point in these cases, and would often break during shipping, thereby rendering the case basically useless. Also, because of the small wheel size the wheels are relatively useless on rough ground, including gravel, sand, dirt, weeds, etc., and would frequently clog with dirt, sand or grass to the point where they no longer worked even on flat pavement.

To minimize the exposure of the wheels to breakage, drone case manufactures use wheels that are typically 2" to 3" in diameter on injection molded cases. These wheels work decently on hard, flat surfaces such as solid pavement, flooring, sidewalks or streets, but trying to roll the cases with heavy contents onto sand, gravel, dirt surfaces is nearly impossible. The surfaces typically inject stones and other items into the wheel assembly housing which lock the wheels, so they are no longer able to turn, causing the user to either drag the case or be forced carry it. These wheels also do not function over sticks, logs or uneven surfaces. So, clearly it would be advantageous to use larger wheels, but these would be easily broken off during travel. Thus, while minimizing the chances that the current wheels will be broken off when the case is shipped or stored, these manufacturers are accepting a trade-off against having a case that can be effectively moved over rough terrain.

Thus, there has existed a long-felt need for a case that has wheels that are large enough to travel over all sorts of terrain, but at the same time, will not be easily broken off during shipping or storage. The current invention provides just such a product with a detachable wheel assembly that can be quickly and efficiently attached to and detached from a protective case. Its wheels are large enough to move over all sorts of terrain, but they can be removed for shipping, storage and other uses during which a protruding wheel can be damaged.

The current invention provides just such a solution by providing a quick snap on and off assembly. This assembly has no mechanical locking system, strictly friction since the cases are used in extreme terrain and the user cannot afford to have springs, latches, etc. malfunction in time of need. Instead, the invention provides large (10" or so) diameter solid wheels that do not go flat or jam up on rough surfaces. The assembly attaches so that the case still sits flat on the ground as to still be 100% usable when opening the case. Because the wheel assembly easily snaps on and off, a user flying drones can wheel the drone case out of the airport on its "stock case wheels", put into a rental car, drive to a remote location, snap on this invention, wheel the case over rough terrain to a desired drone take-off location and fly the drone without worrying about having to carry both the drone and the case back to the car. After the drone photography/videography is done and the dronist returns to the airport, he/she can just snap off the wheel assembly, store it separately, and wheel the case on its original wheels to airport check-in.

OBJECTS OF THE INVENTION

It is therefore an object of the present invention to provide a means by which an owner of a case can transport the case both on the manufacturer's original wheels or the large, adapted wheels depending on the terrain the case it to cross.

Another object of the invention is to provide a detachable wheel assembly that allows an owner of the invention to wheel a case from job to job, and yet remove the wheels for shipping or storage.

Another object of the invention is to specifically supplement the small wheels provided on 3i-Series SKB cases with 10" wheels for rough terrain or sand surfaces by providing a wheel assembly that "lifts" the case above the ground with larger wheels that do not rub against any part of the case during transport.

Another object of the invention is to provide a detachable wheeled case assembly where the wheeled assembly can snap on and snap off with no mechanical parts that could malfunction.

Another object of the invention is to provide a wheeled assembly with never-flat wheels for low maintenance and to prevent service disruption.

An additional object of the invention is to provide a wheeled assembly that comes in three parts for compact storage.

A final object of the invention is to provide a wheel assembly that snaps over existing wheels in a wheeled case to provide larger, tougher wheels for use over rough terrain.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims. The accompanying drawings, which are incorporated in and constitute part of this specification, illustrate embodiments of the invention and, together with the description, serve to explain the principles of the invention.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention. For example, which a case to carry a drone is used in this example, the technology described in this application could apply to any case in any industry.

BRIEF DESCRIPTION OF THE FIGURES

One preferred form of the invention will now be described with reference to the accompanying drawings.

DETAILED DESCRIPTION OF THE FIGURES

Many aspects of the invention can be better understood with references made to the drawings below. The components in the drawings are not necessarily drawn to scale. Instead, emphasis is placed upon clearly illustrating the components of the present invention. Moreover, like reference numerals designate corresponding parts through the several views in the drawings. Before explaining at least one embodiment of the invention, it is to be understood that the embodiments of the invention are not limited in their application to the details of construction and to the arrangement of the components set forth in the following description or illustrated in the drawings. The embodiments of the invention are capable of being practiced and carried out in various ways. In addition, the phraseology and terminology employed herein are for the purpose of description and should not be regarded as limiting.

Figure 1:
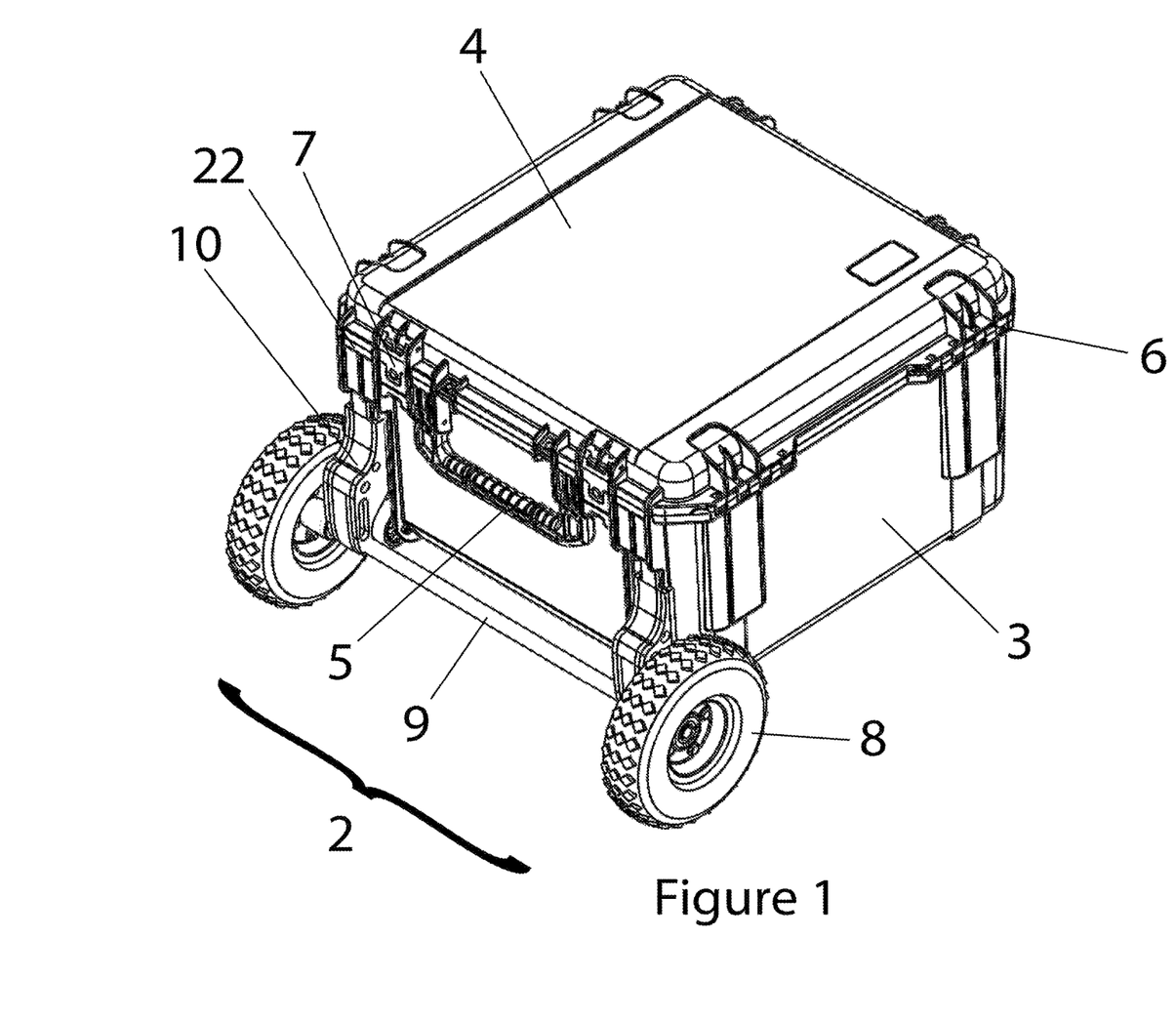
FIG. 1 is an elevated, perspective view of a case with the wheel assembly attached.

FIG. 1 is an elevated, perspective view of a case with the wheel assembly attached. The basic units here are a case assembly and a wheel assembly 2. The case here is for a drone or quadcopter, but this should not be viewed as limiting the applicability of this technology to just drones. The base assembly is comprised of a case base 3 and a case lid 4. Inside the base 3 are usually some foam pieces cut out to cradle a specific make and model of drone, along with some parts and accessories such as its controller, propellers, extra batteries, memory card, chargers, filters, and the like. Over the top of the drone is the lid 4, which is attached to the base 3 by hinges 6. The case assembly has a handle 5 by which a user can carry the unit, and one or more clasps or latches 7 by which the user can secure the lid 4 to the base 3. The case assembly 1 can be lifted and carried by the user, but this is inefficient and, where the drone is large and heavy, impossible. It should be noted that the wheel assembly in this figure completely blocks the original case wheels (17 in FIG. 4)

The wheel assembly 2 solves this problem. The wheel assembly 2 has two wheels 8, one axel 9 and two wheel mounts 10. The basic function of the wheel assembly 2 is to allow a user to quickly and efficiently slide the axel 9 through the wheel mount 10, attach the two wheels 8 with a ⅝" bold shaft threaded (2.25" custom thread length) to the wheel mount, the wheel is secured into place on the axel by a bolt shaft with a ⅝" push nut of a spacer bushing. To attach the wheel assembly to the case, the user in this figure has inserted the support axel 9 into the wheel mount 10 and the wheels 8, then placed the mount tongue (14 in other figures) into the end foot sleeve 21 of the case, and snap the hook portion of the wheel mount over the existing wheels of the wheeled case.

Because the wheel assembly 2 has no need for screws or bolts to attach it to the bottom of the base 3, a user can quickly attach (and detach) the wheel assembly 2 from the case. Take, for example, a professional drone flyer who is using an existing, wheeled case. Should the user of the invention be trying to transport the case across an agricultural field to fly a survey over a nearby field, he/she need merely snap in the wheel assembly 2 and then let the wheels 8 carry the load across the field. But, say, the dronist's next job was in a foreign country, he/she need only snap out the wheel assembly 2 and the case is ready to transport without the worry that any protruding wheels will be damaged during transport.

Figure 2:
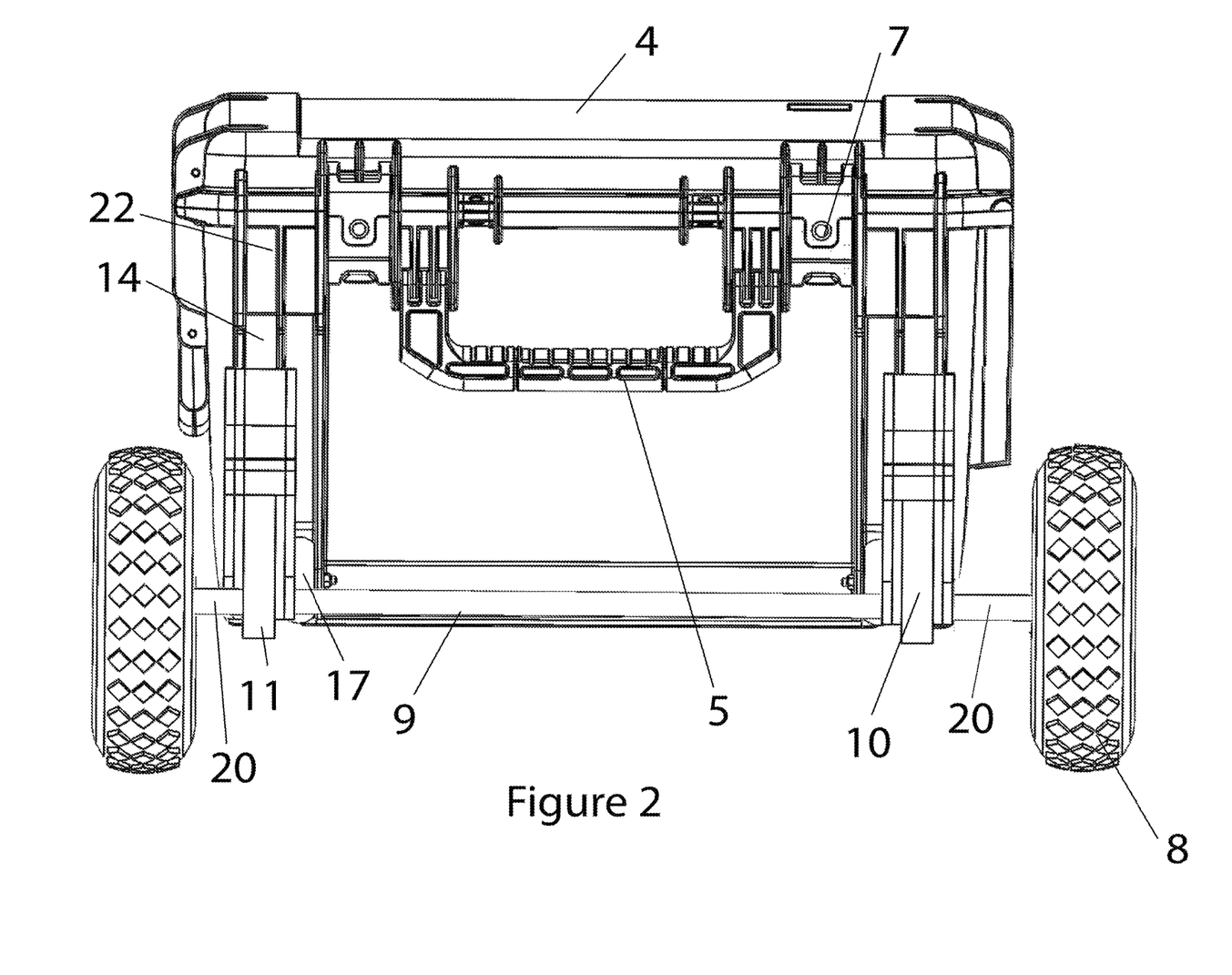
FIG. 2 is front view of a case with the wheel assembly attached.

FIG. 2 is front view a case with the wheel assembly attached. Note how the mount tongue 21 section of the wheel mount 10 has been slid into the end foot sleeve 21 of the case assembly 1, and how the hook 11 has been snapped over the existing wheels (not visible in this figure) of the case.

Figure 3:
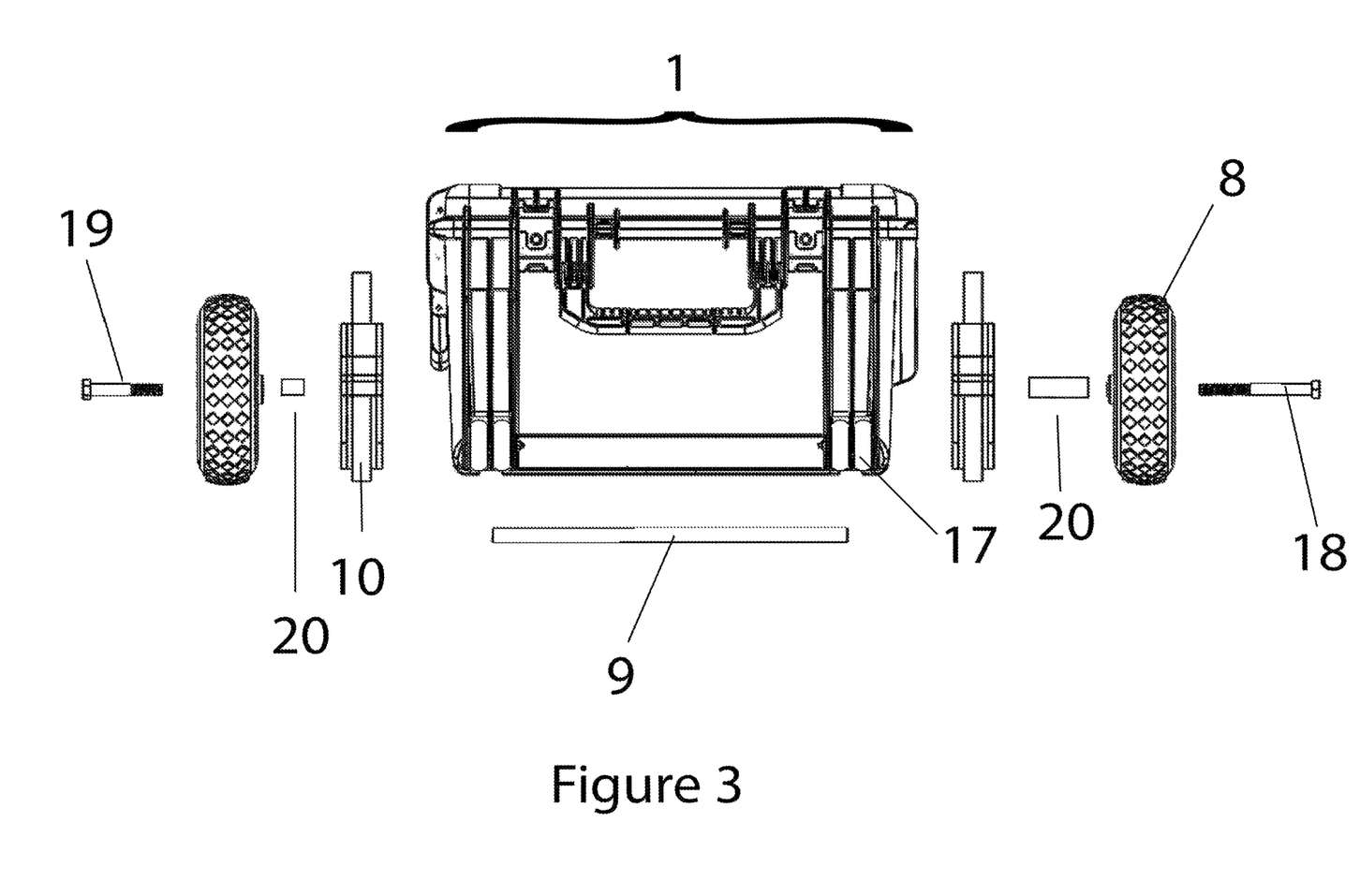
FIG. 3 is a front, exploded view showing a case with the various parts of the wheel assembly in an unassembled form.

FIG. 3 is a front, exploded view showing a case with the various parts of the wheel assembly in an unassembled form. Because the wheels 8, the wheel mounts 10 and the axel 9 have no moving parts, they can be easily assembled and taken apart depending on whether the user of the invention needs to roll the case or transport it via air or vehicle. This figure also illustrates that while the existing wheels 17 on the case are suitable for transporting the case over flat surfaces, they are way too small to effectively transport the case over rough terrain. The wheels 8 of the wheel assembly, however, are much larger and thereby much more effective when hauling the case over sand, dirt, grass or other rough and irregular surfaces.

Figure 4:
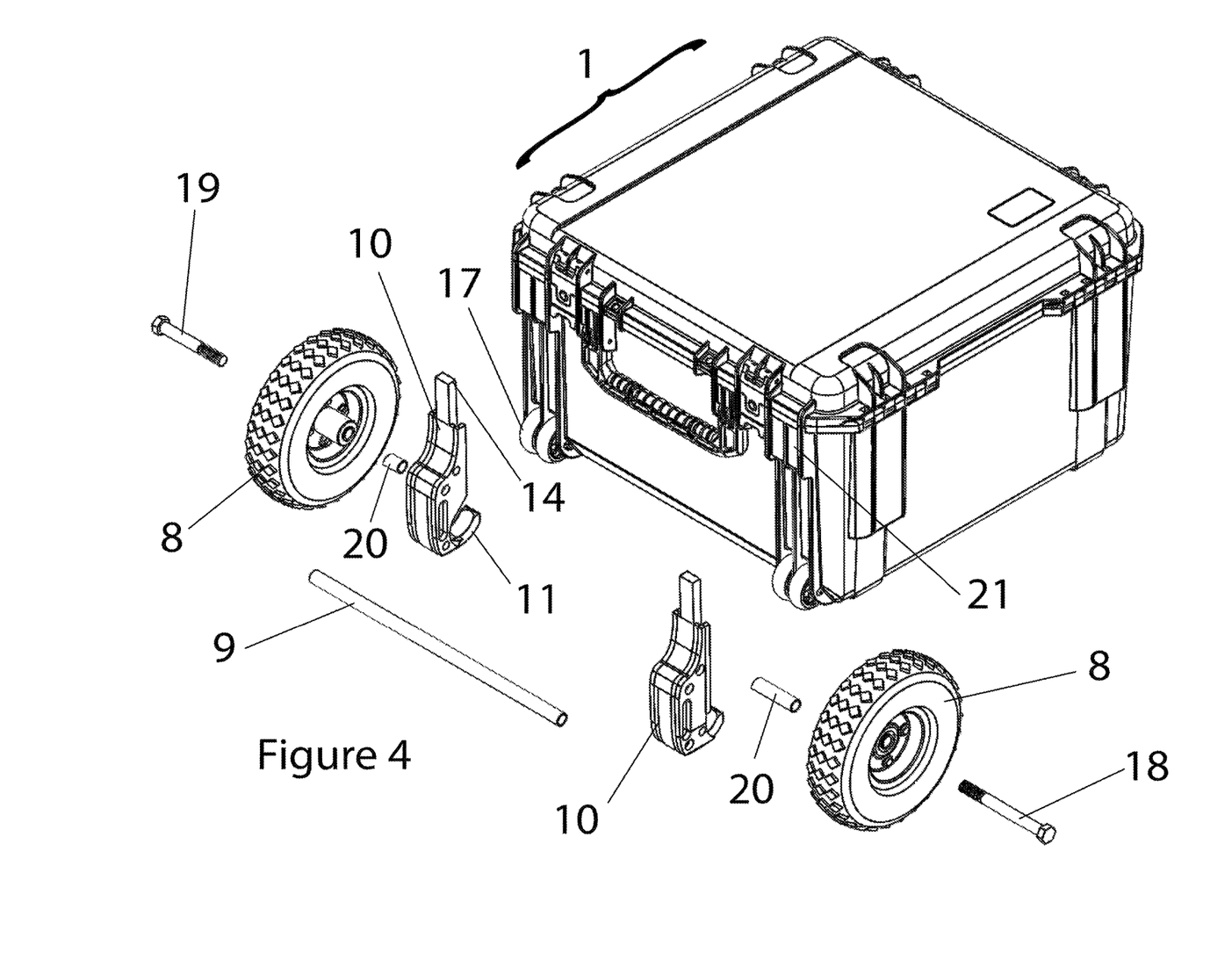
FIG. 4 is an elevated, perspective view showing a case with the various parts of the wheel assembly in an unassembled form.

FIG. 4 is an elevated, perspective view showing a case with the various parts of the wheel assembly in an unassembled form. The case assembly 1 has a front section upon which the wheel assembly is removably mounted. The wheel mount 10 has a mount tongue 14 that fits into the end foot sleeve 21, and the hook 11 portion of the wheel mount 10 snaps around the existing wheels 17 of the case. The axel goes through both wheel mounts 10, and then both wheels 8, where it is secured on both ends by a bolt 19. Should it be noted that the inside diameter of the axel is sufficient to slide over the thread, it does not screw on.

Figure 5:
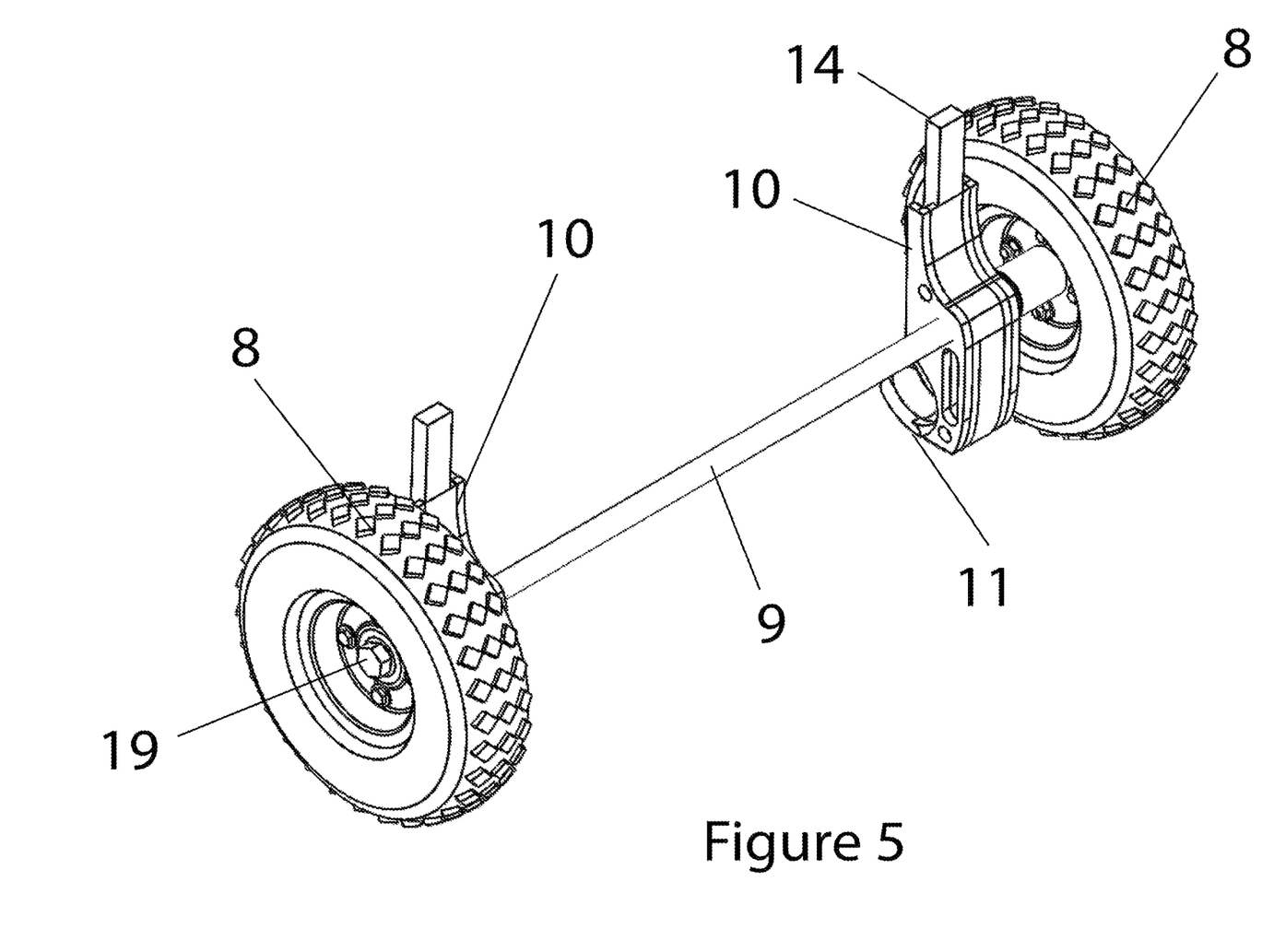
FIG. 5 is a perspective view of the wheel assembly fully assembled.

FIG. 5 is a perspective view of the wheel assembly fully assembled. The threaded bolts 19 have attached the wheels 8 to the axel 9. A foot end 22 spaces the wheel out from the adaptor 10 adequately to allow the wheels 8 to spin freely and not rub against the case while it is being hauled. This figure also illustrated the mount tongue 14 and hook 11 of the wheel assembly.

Figure 6:
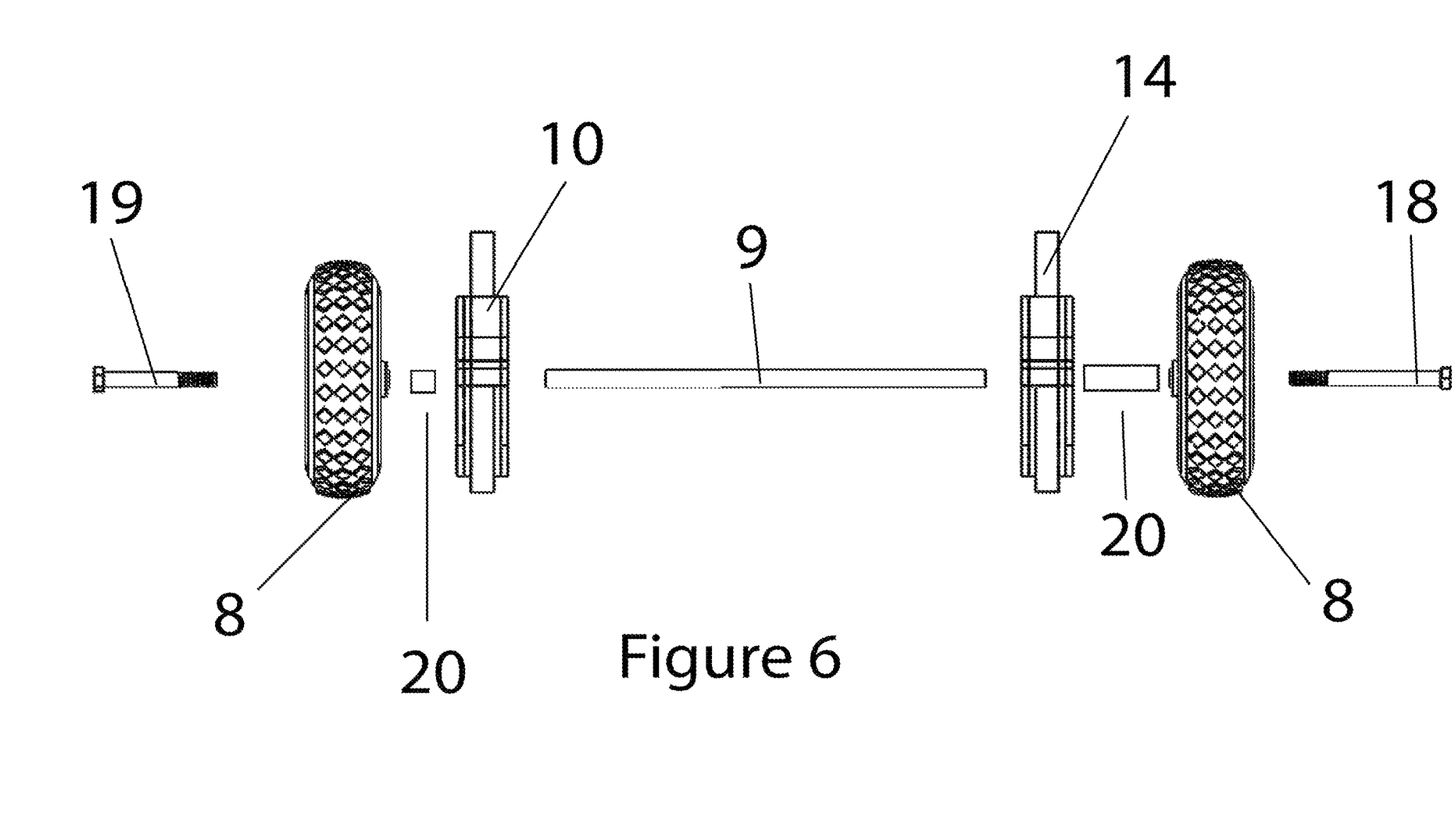
FIG. 6 is an exploded, front view of the wheel assembly in a dis-assembled state.

FIG. 6 is an exploded, front view of the wheel assembly in a dis-assembled state.

Figure 7:
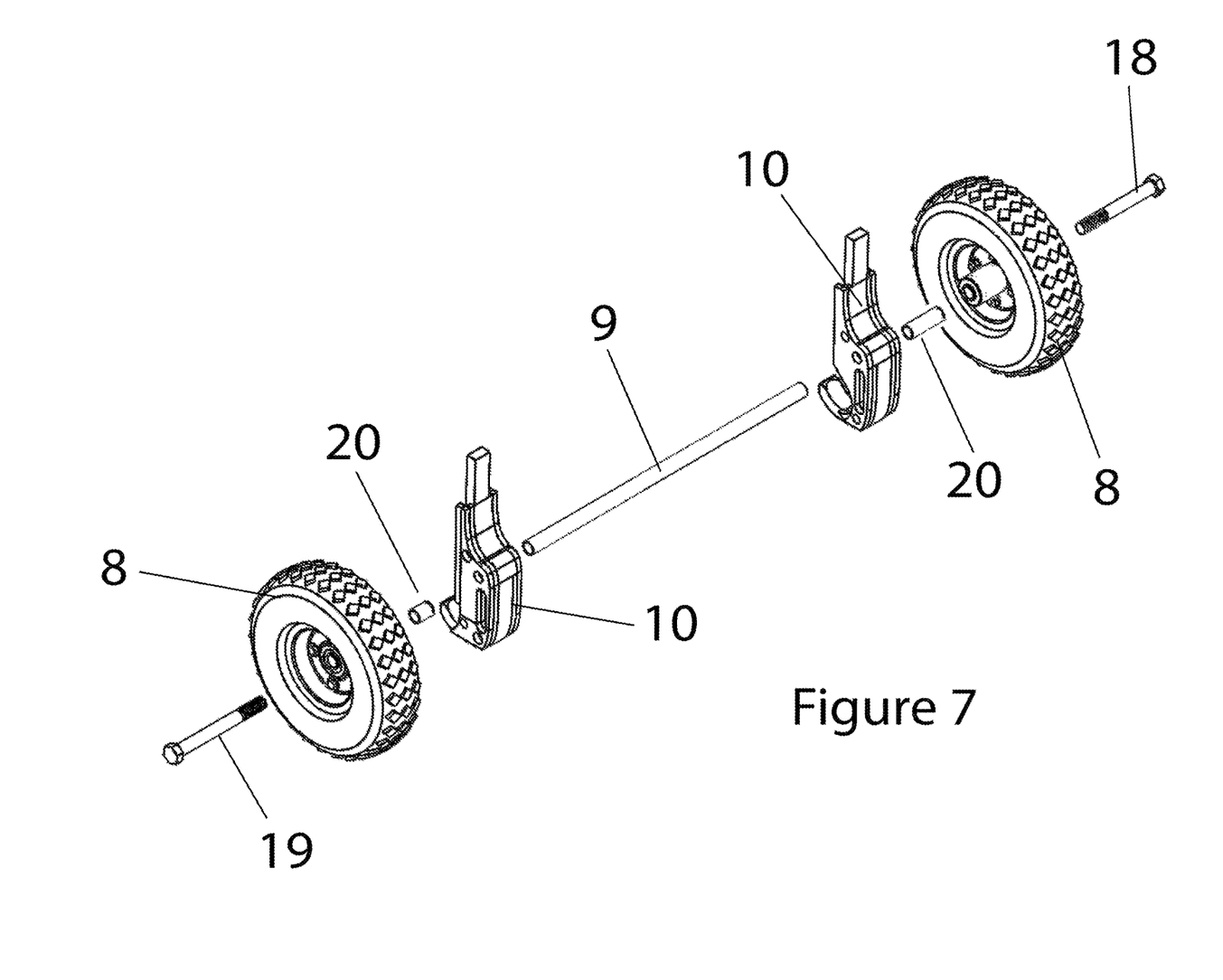
FIG. 7 is an exploded, perspective view of the wheel assembly in a dis-assembled state.

FIG. 7 is an exploded, perspective view of the wheel assembly in a dis-assembled state. Bolt 19 will pass through the axel hole in wheel 8, then through shaft spacer 20, then through the axel hold hole in the wheel mount 10, whereupon the threaded end of bolt 19 will slide into mating non-threading end of axel 9.

Figure 8:
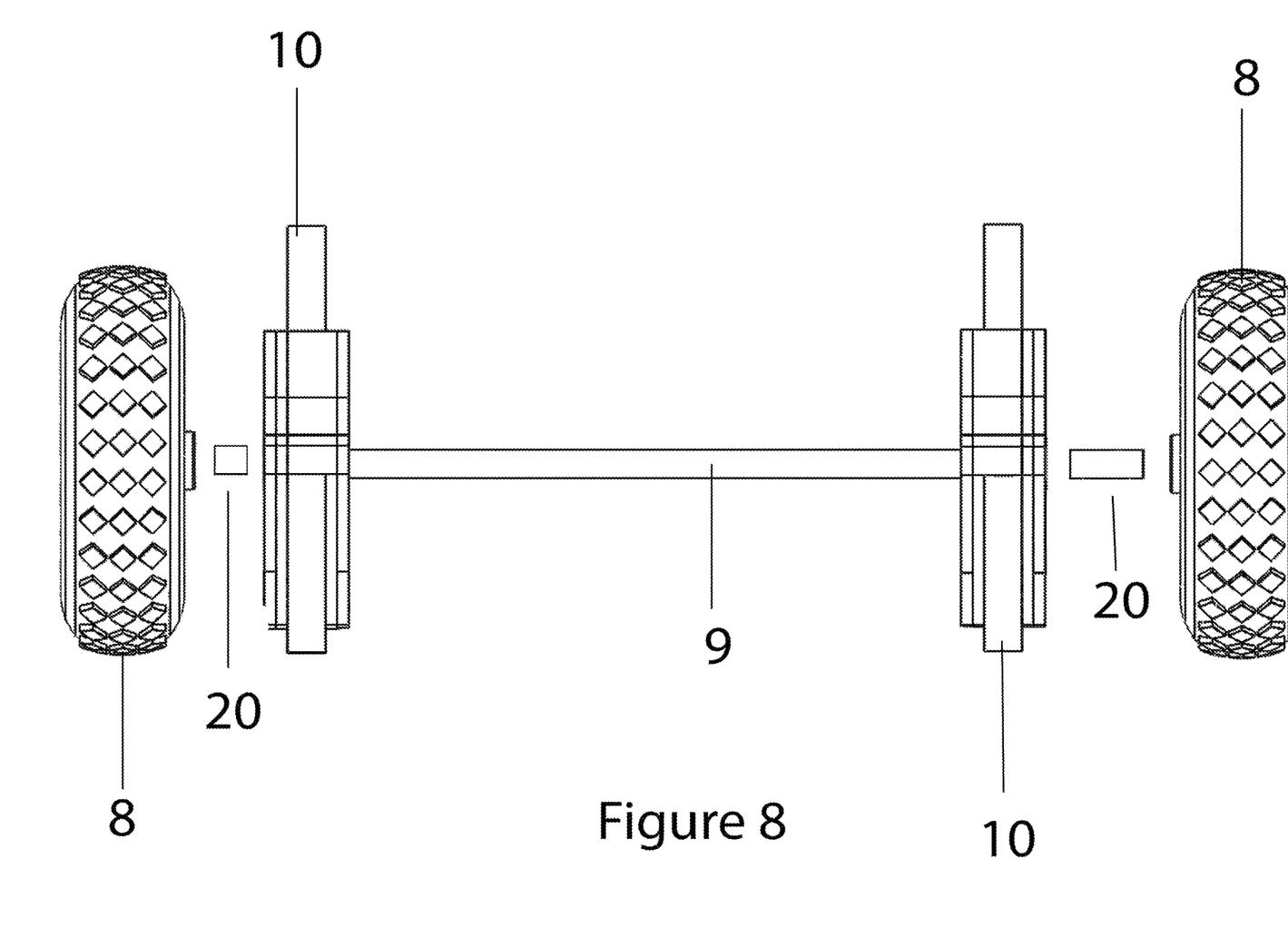
FIG. 8 is a front view of the wheel assembly fully assembled.

FIG. 8 is a front view of the wheel assembly fully assembled.

Figure 9:
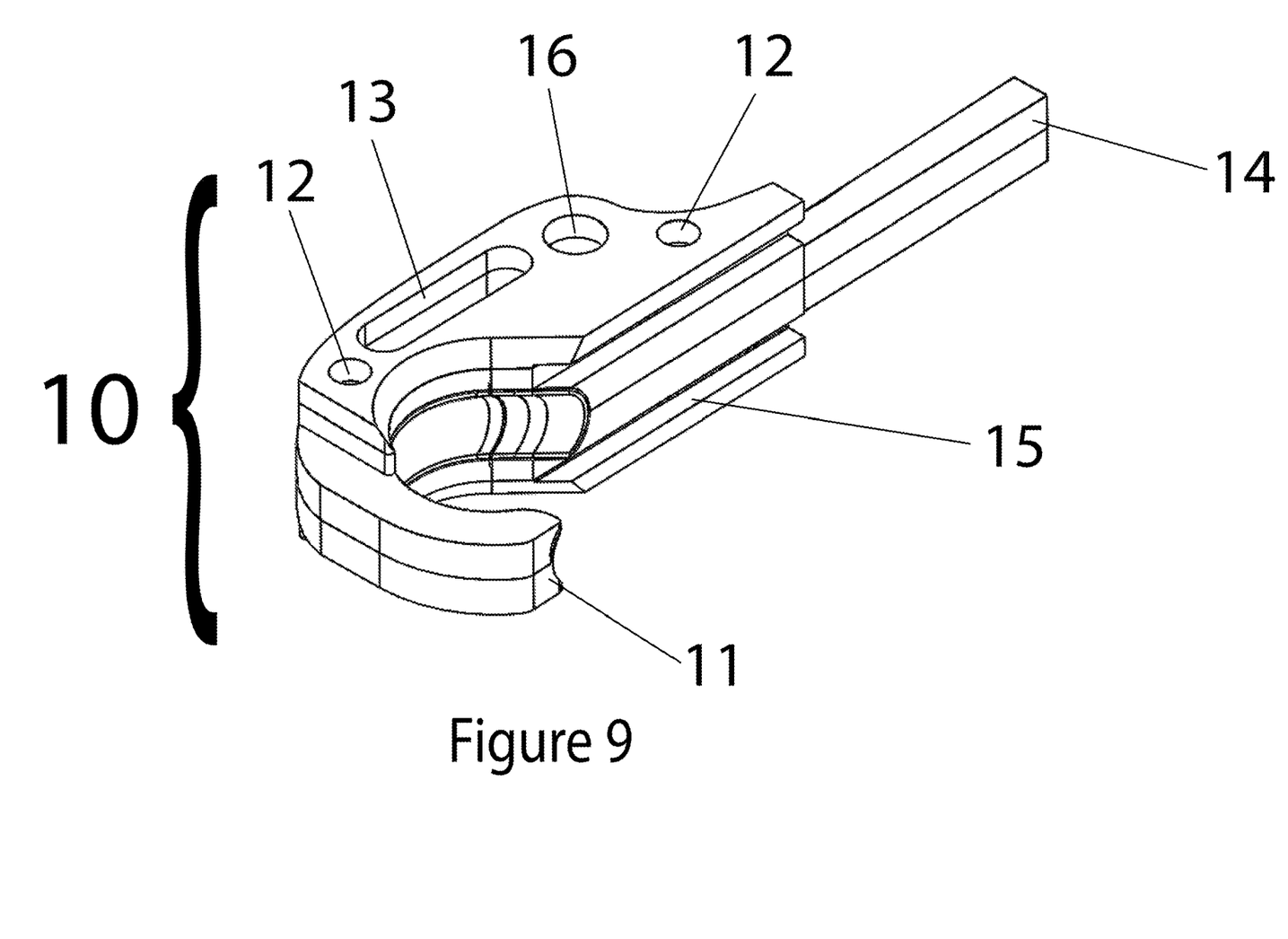
FIG. 9 is a perspective view of the wheel mount

FIG. 9 is a perspective view of the wheel mount 10. Holes numbered 12 are for recessed screw to hold the two machined halves of the mount together. #16 has a combination of purposes, it is threaded for the ⅝" bolt from the outside and a ¾" hole from the inside to insert the support axel 9 into place. Slot 13 decreases the weight of the wheel mount 10, and allows for a person to grab the wheel mount 10 for attachment or detachment. The hook 11 snaps over existing wheels in the case, while support rail 15 provides strength to the unit by sliding over the molded case rails.

Figure 10:
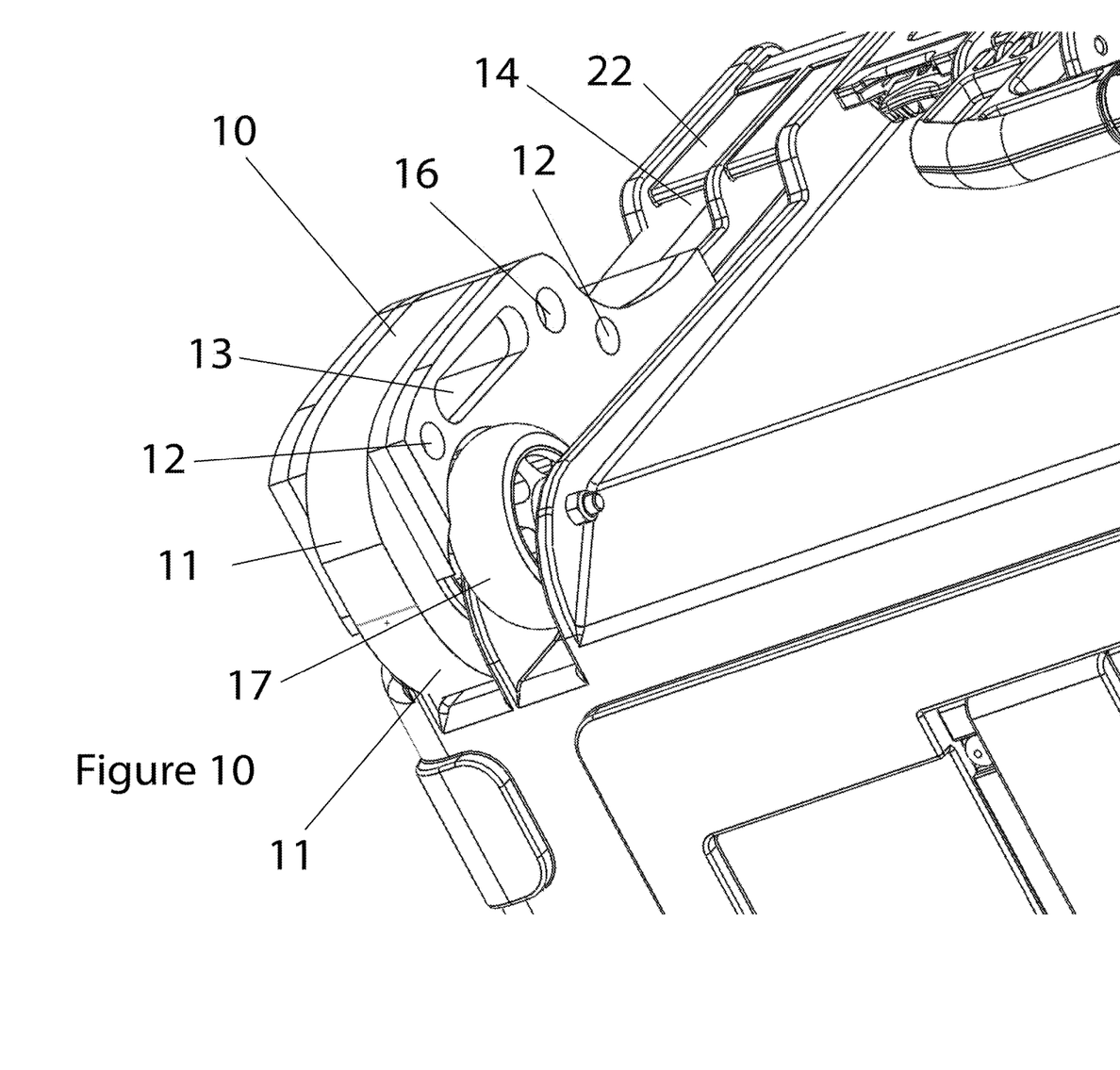
FIG. 10 is a close-up view of the tongue mount portion of the wheel mount ready for insertion into the end foot sleeve, which is a cavity in the wheeled case.

FIG. 10 is a close-up view of the wheel mount, generally referenced as 10. The tongue mount 14 portion of the wheel mount has been inserted into the end foot sleeve cavity 21, which is has a cavity in the wheeled case. As the tongue mount 14 is slid into the end foot sleeve cavity 21 of the case, the hook is lined up over the existing wheels such that the hook can be snapped against the existing wheels and removably attached thereto. A finger slot/grip 13 allows a user to easily snap the wheel assembly onto, and off of the case.

Figure 11:
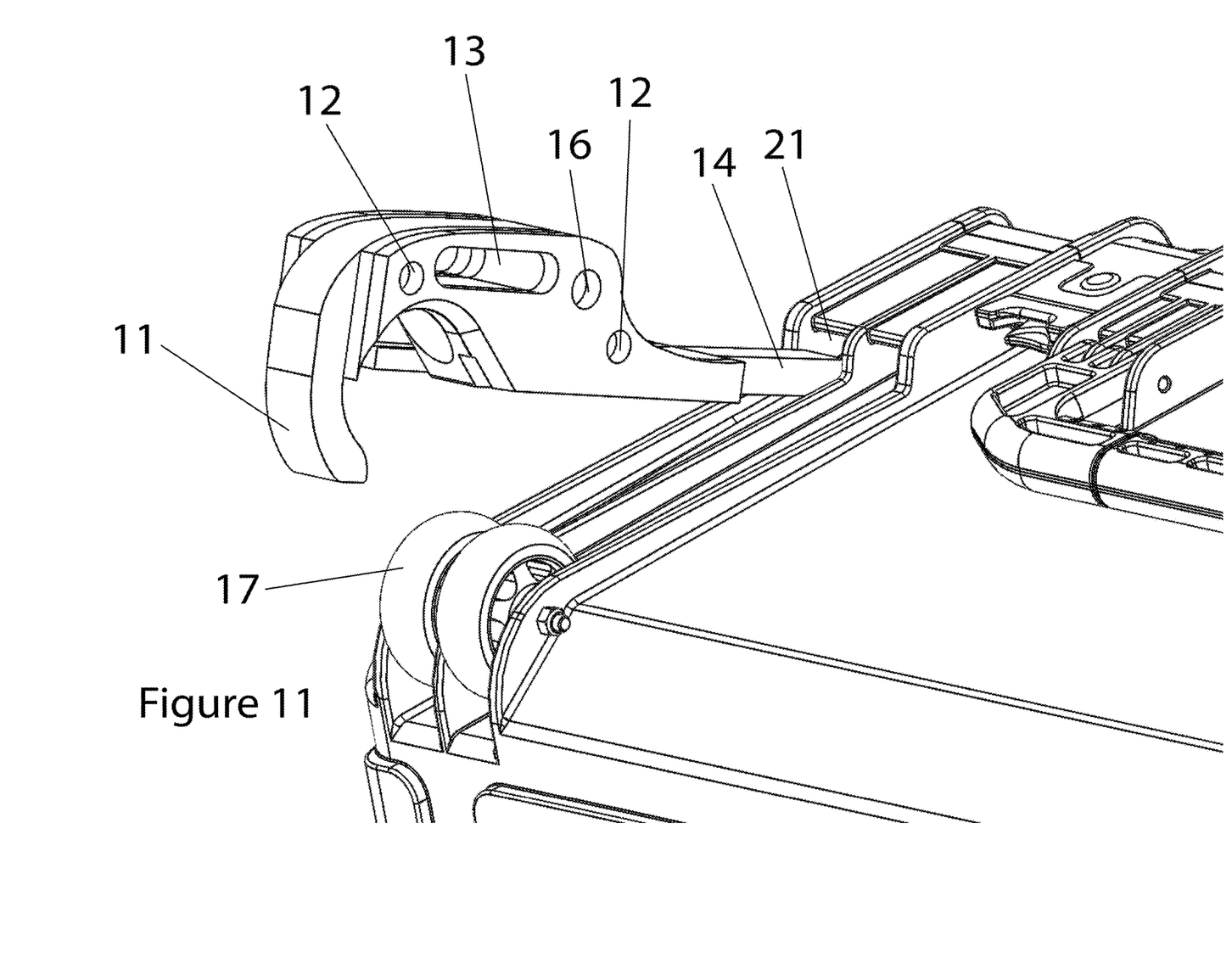
FIG. 11 is a close-up view of the wheel assembly being prepared for connection to the case assembly.

FIG. 11 is a close-up view of the wheel assembly being prepared for connection to the case assembly. The tongue mount 14 has been lined up with the cavity inside the end foot 22. As the tongue mount 14 slides in, the hook 11 becomes positioned over and forced down up the existing wheels 17. Screw assembly holes 12 allow the wheel mount to be made in two parts and screwed together for easier manufacture.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

REFERENCE NUMBERS USED

1. Case Assembly
2. Wheel Assembly
3. Case Base
4. Case Lid
5. Handle
6. Case hinge
7. Case Latch
8. Wheel
9. Support Axel
10. Wheel Mount
11. Hook
12. Screw assembly hole
13. Finger Slot/Grip
14. Mount tongue
15. Support Rail
16. Axel hole
17. SKB 3I—2.75" stock wheel/case wheels
18. 6"—⅝" bolt with extended thread
19. 5"—⅝" bolt with extended thread
20. spacer bushing (left ½" long, right 1½" long)
21. End Foot Sleeve Cavity
22. Foot End That which is claimed:

1. A case for transportation, comprising: a case assembly and a wheel assembly,
where the case assembly comprises a handle, a base, a lid, two or more case wheels, and two end foot sleeves, additionally comprising means of attachment between the base and the lid, where the means of attachment between the base and the lid is one or more hinges, means of removably securing the lid to the base, where the means of removably securing the lid to the base is a case latch, and means of attachment between the wheel assembly and the case assembly, where the means of attachment between the wheel assembly and the case assembly is two wheel mounts, where the wheel assembly comprises an axel, where the axel has two open ends, where each of the two open ends has a threaded interior, two spacer bushings, two foot ends, two wheels, where each wheel has a wheel axel hole with a wheel axel hole diameter, two threaded bolts, where each with a bolt head and a threaded bolt end, where the threaded bolt head has a threaded bolt head diameter, and the threaded bolt head diameter is greater than the wheel axel hole diameter, where the threaded bolt end mates with the threaded interior of the axel, and two wheel mounts, where each of the two wheel mounts comprises a hook, a finger slot, by which a user of the invention can pull and push the wheel mount to snap it in or remove it, two screw assembly holes, a wheel mount axel hole, a mount tongue, and a support rail, such that the two bolts can attach the two wheels and the two wheel mounts to the axel, creating the wheel assembly, where each of the two bolts is inserted through the wheel axel hole, then a push net, then the wheel mount axel hole, and then the threaded bolt end is then screwed into a threaded interior of the axel, where the two wheel mounts on the wheel assembly are configured such that they mate with the case assembly, with the mount tongue of the wheel mount being inserted into an end foot sleeve on the case assembly, where the hook removably snaps over at least one of the two or more case wheels, where the two wheel mounts are configured such that they mate with the case assembly and the two wheels can rotate freely without contacting the case assembly, where the wheel assembly can be removably attached and detached to and from the case assembly such that a user of the invention can easily "snap in" the wheel assembly into the case assembly when the user is transporting the case over a rough terrain, and then easily "snap it out" to remove it when the user is transporting the case.

2. The case of claim 1, where the case assembly is an SKB 3i Series case, where the number of case wheels is four, with two case wheels on a right side of the case and two case wheels on a left side of the case, where each of the four wheels is an SKB 3I—2" stock wheel.

3. A wheel assembly, comprising: an axel, two wheels, and two wheel mounts, where the two wheel mounts are configured such that they mate with a case assembly and the two wheels can rotate freely without contacting the case assembly, where the axel has two open ends, where each of the two open ends has a threaded interior, additionally comprising two spacer bushings, where each wheel has a wheel axel hole with a wheel axel hole diameter, additionally comprising two threaded bolts, where each of the two threaded bolts has a bolt head and a threaded bolt end, where the threaded bolt head has a threaded bolt head diameter, and the threaded bolt head diameter is greater than the wheel axel hole diameter, where the threaded bolt end mates with the threaded interior of the axel, thereby securing the two wheel mounts and the two wheels to the axel, and additionally comprising two foot ends, where each of the two foot ends separates a wheel from a wheel mount.

4. The wheel assembly of claim 3, where each wheel mount comprises a hook, a mount tongue and an axel hole, where the axel can pass through the axel hole, the hook snaps over two or more case wheels of a case, and the mount tongue can be inserted into an end foot sleeve in the case. where each of the two wheel mounts comprises a hook, a finger slot, by which a user of the invention can pull and push the wheel mount to snap it in or remove it, two screw assembly holes, a wheel mount axel hole, a mount tongue, and a support rail, such that the two bolts can attach the two wheels and the two wheel mounts to the axel, creating the wheel assembly, where each of the two bolts is inserted through the wheel axel hole, then a push net, then the wheel mount axel hole, and then the threaded bolt end is screwed into a threaded interior of the axel, thereby securing the two wheels and the two wheel mounts to the axel.

5. The wheel assembly of claim 4, where the two wheel mounts on the wheel assembly are configured such that they mate with the case assembly, with the mount tongue of the wheel mount is inserted into an end foot sleeve on the case assembly, where the hook removably snaps over at least one of the two or more existing wheels, where the wheel assembly can be removably attached and detached to and from the case assembly such that a user of the invention can easily "snap in" the wheel assembly into the case assembly when the user is transporting the case over a rough terrain, and then easily "snap it out" to remove it when the user is transporting the case.

6. The wheel assembly of claim 4, where the hook of the wheel mount removably attaches to two or more existing wheels of a case, and the mount tongue is inserted into an end foot sleeve of the case, where the case assembly is a SKB 3i Series case, where the number of case wheels is four, with two case wheels on a right side of the case and two case wheels on a left side of the case, where each of the four wheels is an SKB 3I—2" stock wheel and where the wheel mount additionally comprises a first half and a second half, where the first half and the second half each additionally comprise two screw assembly holes by which the first half and the second half are connected to each other by two or more screws.

7. The wheel mount assembly of claim 3, where the wheel mount additionally comprises two round holes for assembly screws, and where the wheel mount additionally comprises a first half and a second half, where the first half and the second half each additionally comprise two screw assembly holes by which the first half and the second half are connected to each other by two or more screws.

8. The wheel mount of claim 7, where the two bolts are five inch, ⅝" bolts with extended threads.

9. The wheel mount of claim 7, where the hook of the wheel mount has a hook diameter, and the two or more case wheels of the case each has a case wheel diameter, and where the hook diameter is slightly smaller than the case wheel diameter, such that when the hook is snapped over the two or more case wheels, the wheel mount is removably secured over the two or more case wheels.

10. A case for transportation, comprising: a case assembly and a wheel assembly,
where the case assembly comprises a handle, a base, a lid, two or more case wheels, and two end foot sleeves, additionally comprising means of attachment between the base and the lid, where the means of attachment between the base and the lid is one or more hinges, means of removably securing the lid to the base, where the means of removably securing the lid to the base is a case latch, and means of attachment between the wheel assembly and the case assembly is two wheel mounts, where the wheel assembly comprises an axel, where the axel has two open ends, where each of the two open ends has a threaded interior, two spacer bushings, two wheels, where each wheel has a wheel axel hole with a wheel axel hole diameter, two threaded bolts, where each threaded bolt has a bolt head and a threaded bolt end, where the threaded bolt head has a threaded bolt head diameter, and the threaded bolt head diameter is greater than the wheel axel hole diameter, where the threaded bolt end mates with the threaded interior of the axel, and two wheel mounts, and where the wheel assembly can be removably attached and detached to and from the case assembly such that a user of the invention can easily "snap in" the wheel assembly into the case assembly, and then easily "snap it out" to remove it.

11. The case of claim 10, where the case assembly is an SKB 3i Series case, where the number of case wheels is four, with two case wheels on a right side of the case and two case wheels on a left side of the case, where each of the four wheels is an SKB 3I—2" stock wheel, and where the wheel mount additionally comprises a first half and a second half, where the first half and the second half each additionally comprise two screw assembly holes by which the first half and the second half are connected to each other by two or more screws.

12. The case of claim 10, where the wheel assembly comprises an axel, two wheels, and two wheel mounts, where the two wheel mounts are configured such that they mate with a case assembly and the two wheels can rotate freely without contacting the case assembly, where the axel has two open ends, where each of the two open ends has a threaded interior, additionally comprising two spacer bushings, where each wheel has a wheel axel hole with a wheel axel hole diameter, additionally comprising two threaded bolts, where each of the two threaded bolts has a bolt head and a threaded bolt end, where the threaded bolt head has a threaded bolt head diameter, and the threaded bolt head diameter is greater than the wheel axel hole diameter, where the threaded bolt end mates with the threaded interior of the axel, and two wheel mounts, where each wheel mount is separated from a wheel by a foot end.

13. The case of claim 12, where each wheel mount comprises a hook, a mount tongue and an axel hole, where the axel can pass through the axel holes, and the mount tongue can be inserted into an end foot sleeve in the case. where each of the two wheel mounts comprises a hook, a finger slot, by which a user of the invention can pull and push the wheel mount to snap it in or remove it, two screw assembly holes, a wheel mount axel hole, a mount tongue, and a support rail, such that the two bolts can attach the two wheels and the two wheel mounts to the axel, creating the wheel assembly, where each of the two bolts is inserted through the wheel axel hole, then through a push net, then through the wheel mount axel hole, and then the threaded bolt end is screwed into a threaded interior of the axel, thereby securing the two wheels and the two wheel mounts to the axel.

14. The case of claim 13, where the two wheel mounts on the wheel assembly are configured such that they removably mate with the case assembly, with the mount tongue of the wheel mount being inserted into an end foot sleeve on the case assembly, where the hook removably snaps over at least one of the two or more existing wheels, where the wheel assembly can be removably attached and detached to and from the case assembly such that a user of the invention can easily "snap in" the wheel assembly into the case assembly when the user is transporting the case over a rough terrain, and then easily "snap it out" to remove it when the user is transporting the case.

15. The case of claim 14, where the hook of the wheel mount removably attaches to two or more existing wheels of a case, and the mount tongue is inserted into an end foot sleeve of the case, where the case assembly is a SKB 3i Series case, where the number of case wheels is four, with two case wheels on a right side of the case and two case wheels on a left side of the case, where each of the four wheels is an SKB 3I—2" stock wheel. where the case assembly is a SKB 3i Series case, where the number of case wheels is four, with two case wheels on a right side of the case and two case wheels on a left side of the case, where each of the four wheels is an SKB 3I—2" stock wheel.

16. The case of claim 15, where the wheel mount additionally comprises two round holes for assembly screws, and where the wheel mount additionally comprises a first half and a second half, where the first half and the second half each additionally comprise two screw assembly holes by which the first half and the second half are connected to each other by two or more screws.

17. The case of claim 16, where the two bolts are five inch, ⅝" bolts with extended threads.

18. The case of claim 13, where the hook of the wheel mount has a hook diameter, and the two or more case wheels of the case each has a case wheel diameter, and where the hook diameter is slightly smaller than the case wheel diameter, such that when the hook is snapped over the two or more case wheels, the wheel mount is removably secured over the two or more case wheels.

19. The case of claim 18, where the wheel mount additionally comprises a slot, where the slot can accommodate one or more fingers of a user.

* * * * *